United States Patent
Crockett et al.

[11] Patent Number: 5,460,106
[45] Date of Patent: Oct. 24, 1995

[54] METHOD, APPARATUS AND DEVICE FOR DELIVERING AND DISTRIBUTING A FOAM CONTAINING A SOIL ADDITIVE INTO SOIL

[75] Inventors: David P. Crockett, Manteca; Frank O. Martinez, Escalon; Scott J. Zweep, Livermore, all of Calif.

[73] Assignee: Foam Innovations, Inc., Pleasanton, Calif.

[21] Appl. No.: 126,541

[22] Filed: Sep. 24, 1993

[51] Int. Cl.$^6$ .................................................. A01C 21/00
[52] U.S. Cl. ........................ 111/127; 111/120; 172/21
[58] Field of Search ................................ 111/120, 121, 111/122, 123, 124, 125, 126, 127, 128, 130, 174, 186, 36, 1, 7, 200; 239/592, 601; 172/7, 20, 21

[56] References Cited

U.S. PATENT DOCUMENTS

| | | | |
|---|---|---|---|
| 3,295,480 | 1/1967 | Haynes | 111/120 |
| 3,692,512 | 9/1972 | Sachnik . | |
| 3,713,404 | 1/1973 | Lavo et al. | 111/200 |
| 3,791,321 | 2/1974 | Tsutsumi | 111/123 X |
| 3,831,859 | 8/1974 | Allard | 239/592 |
| 4,257,340 | 3/1981 | Mickelsson et al. | 111/186 X |
| 4,388,878 | 6/1983 | Demzin | 111/186 |
| 4,765,261 | 8/1988 | Kaneko | 111/123 |
| 4,807,544 | 2/1989 | Cross et al. | 111/7 |
| 4,822,613 | 4/1989 | Rodero . | |
| 5,207,168 | 5/1993 | Comer | 172/21 X |
| 5,303,663 | 4/1994 | Salestrom | 111/174 X |

FOREIGN PATENT DOCUMENTS

| | | |
|---|---|---|
| 58-17161 | 12/1981 | Japan . |
| 58-43050 | 4/1982 | Japan . |
| 60-34901 | 2/1985 | Japan . |

*Primary Examiner*—Randolph A. Reese
*Assistant Examiner*—Robert Pezzuto
*Attorney, Agent, or Firm*—Fliesler, Dubb, Meyer, & Lovejoy

[57] ABSTRACT

A sub-soil injection device injects a soil additive, such as a pesticide, as included in a foam below the surface of soil. It concurrently distributes the foam into soil as the foam is injected resulting in an improved uniformity of distribution of soil additive in soil. The device comprises a tubular structure which mounts into the soil from a vehicle. It has first and second portions, leading and trailing portions, a lumen along its length, lateral portions and a plurality of spaced apart ports. Each port communicates the lumen with the trailing portion. Foam flowing out the ports moves backwardly. A shank structure precedes and shields the leading portion of the member. The shank structure has a forward-facing portion adapted to cut through soil. The shank structure and member are motivated by the vehicle in a forward direction through the soil. An apparatus utilizing the shank structure, the vehicle and a foam generator and a method of depositing a soil additive plowing in of foam are also set forth.

25 Claims, 10 Drawing Sheets

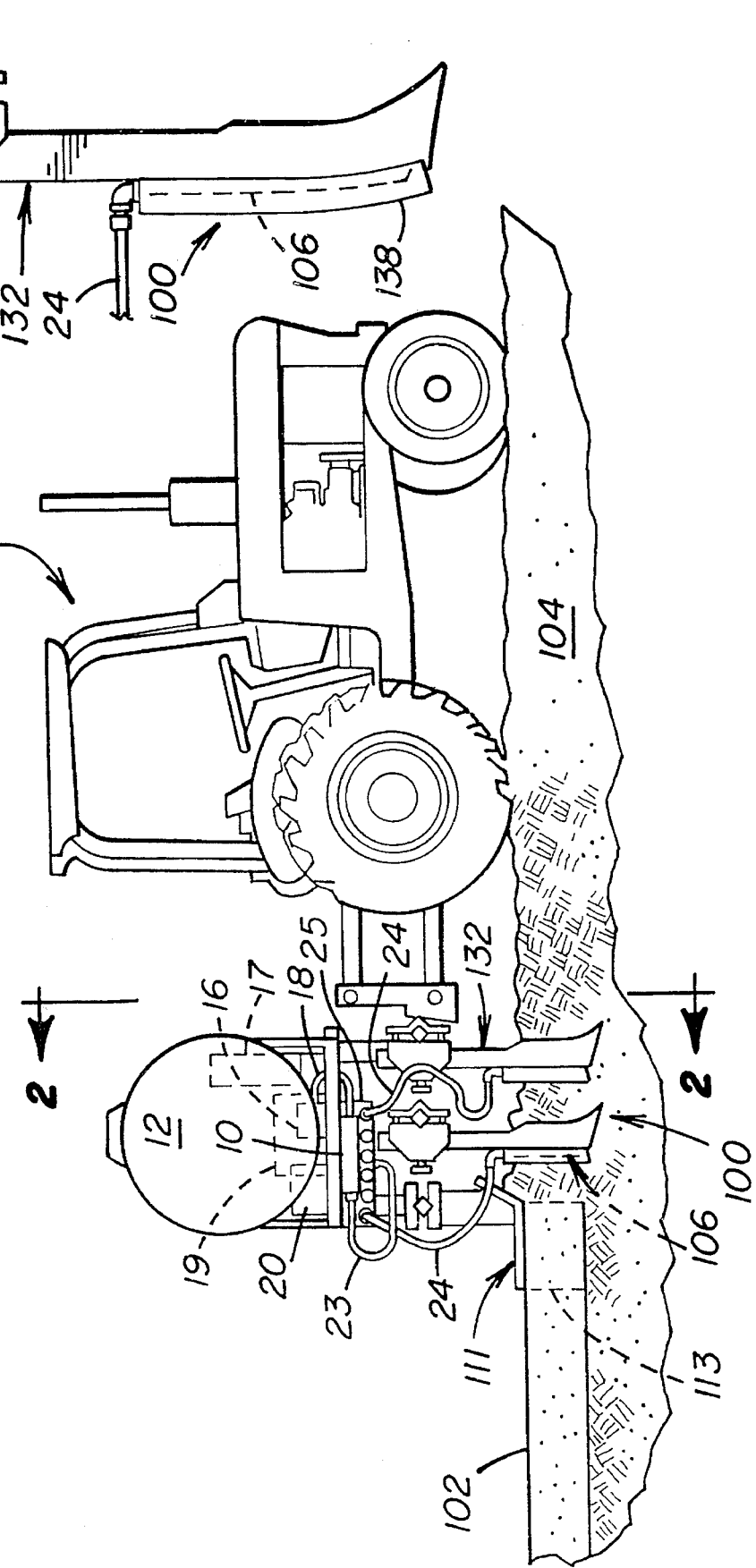
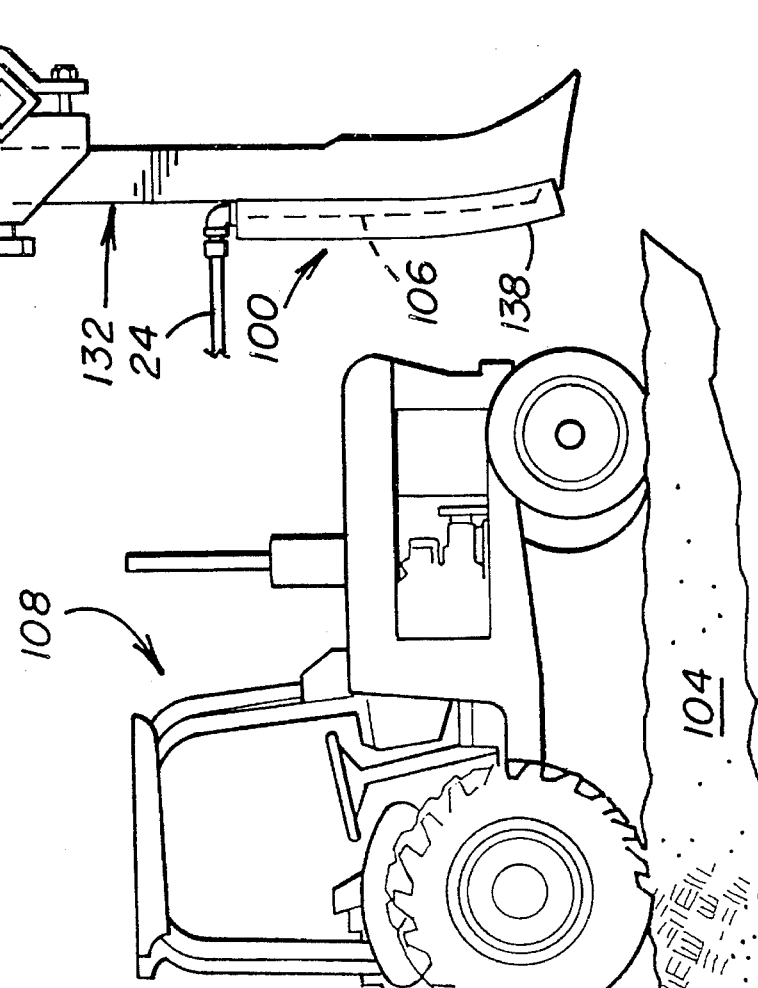

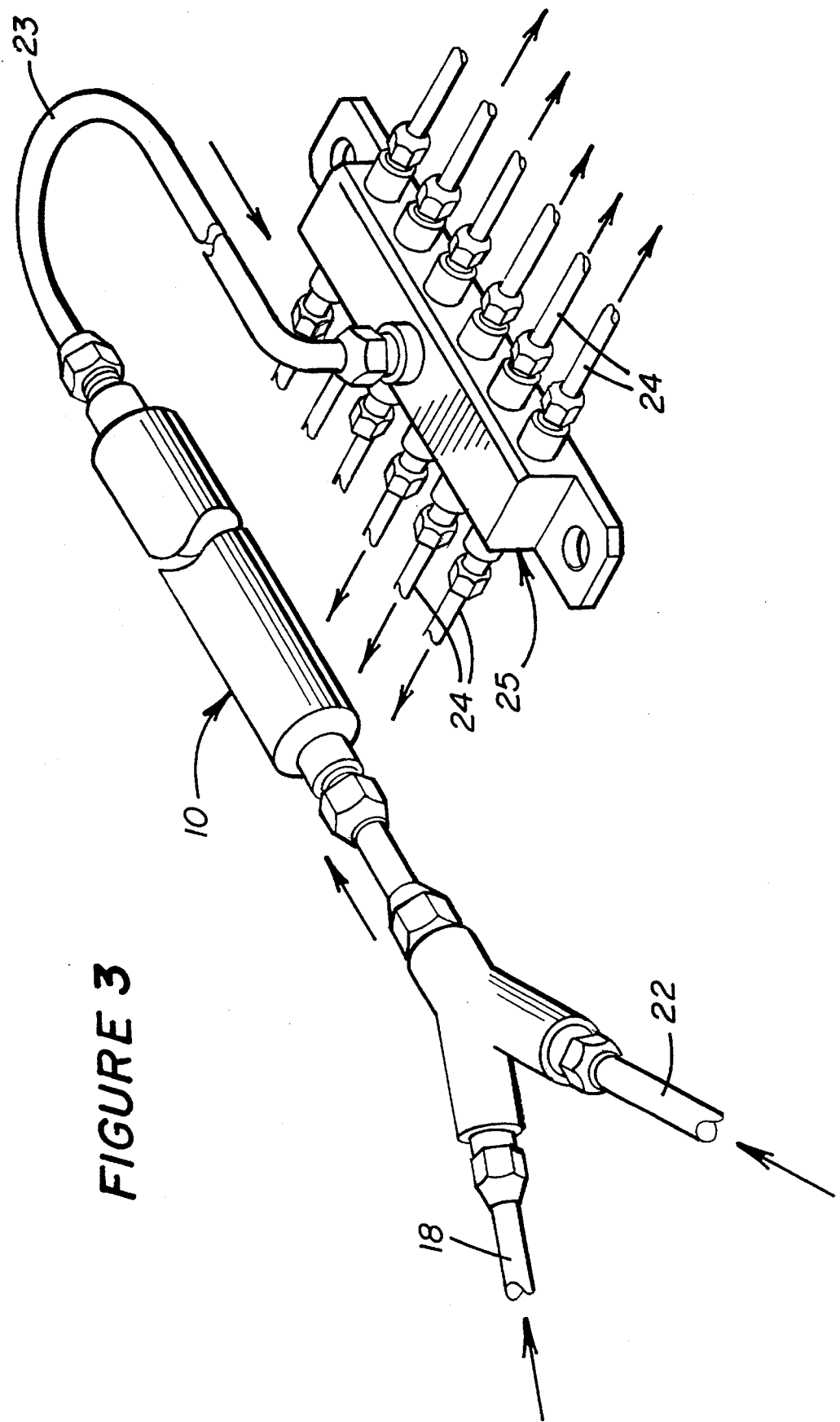

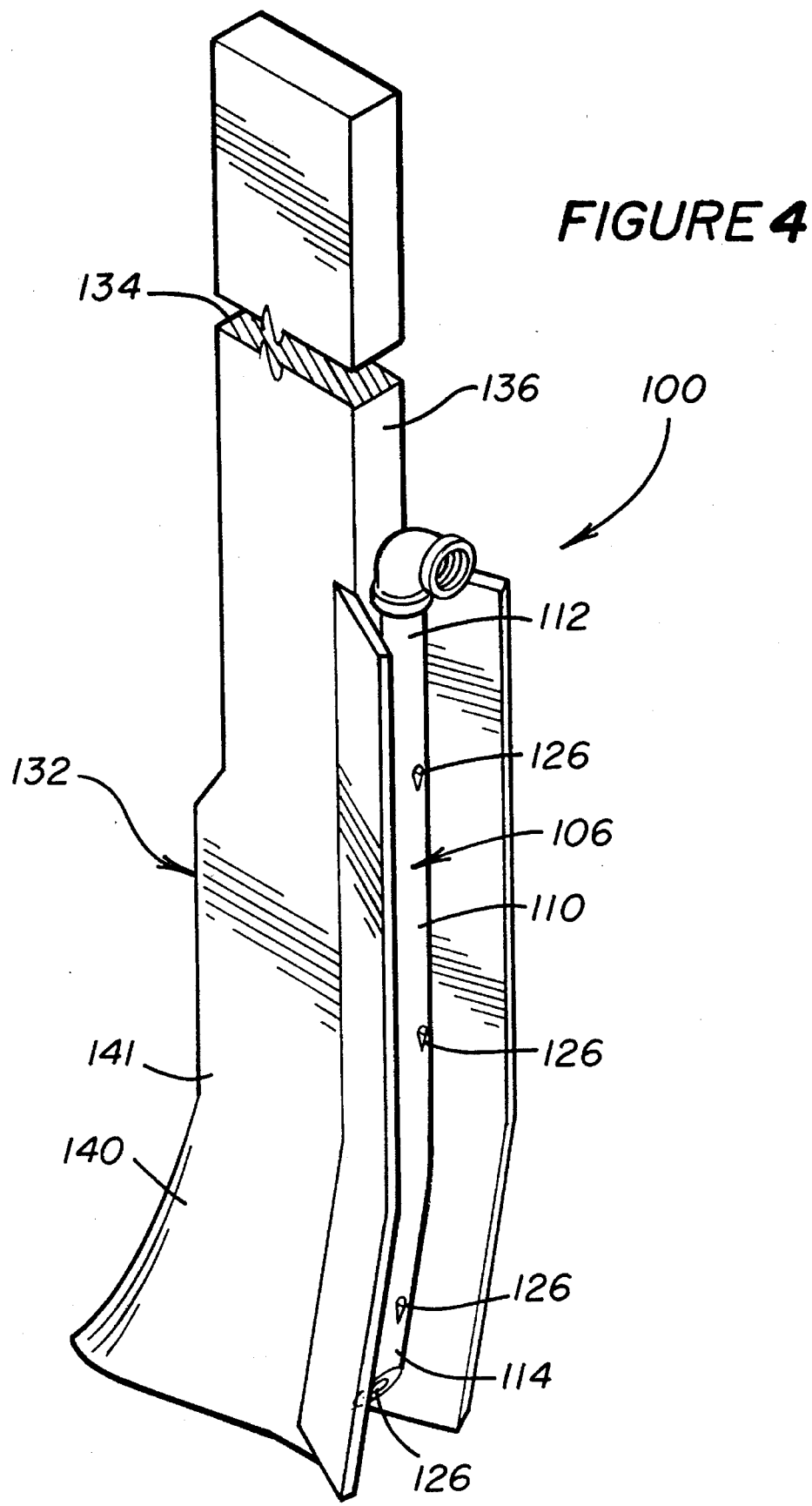

METHOD, APPARATUS AND DEVICE FOR DELIVERING AND DISTRIBUTING A FOAM CONTAINING A SOIL ADDITIVE INTO SOIL

TECHNICAL FIELD

This invention relates to a device, an apparatus and a method for applying a soil additive and intermixing and distributing the same with soil via a plowing operation so as to control subsurface pests such as nematodes, deliver fertilizer, alter soil properties, or the like.

BACKGROUND OF THE INVENTION

Subsurface pests are difficult to control with pesticides since it is very hard to distribute the pesticides in the soil in a manner which assures a high degree of effectiveness. Attempts to inject liquid pesticide formations while plowing or otherwise turning soil have been of limited effectiveness because the pesticide does not get sufficiently uniformly distributed throughout the desired portion of the soil whereby the pests, e.g., nematodes, are not all contacted and killed in the areas which are skipped during treatment. Most liquids, namely those which do not easily vaporize, and which are interjected at intervals, simply cannot migrate horizontally, even in recently turned porous or moderately porous soil, in the way necessary to form the continuous barrier which is required to effectively alleviate damage by subsurface pests. The above problems have been increased due to the fact that many present day pesticides are somewhat less effective than previous pesticides which, unfortunately, have been discovered to have unacceptable environmental impacts. Thus, with many present day pesticides it is even more important that they be uniformly distributed throughout the soil. Similar problems exist with uniformity of distributing of other soil additives such as fertilizers and soil adjuvants with soil. Accordingly, there are disadvantages with subsurface injection of certain liquid soil additives.

U.S. Pat. No. 3,692,512 shows the preparation of foams for applying chemicals to plants, soil surfaces or the like in the open. The foam desirably is stable in the sense that it will stay moist on the plants surface for at least ten to fifteen minutes. U.S. Pat. No. 3,692,512 is, however, in no way concerned with deposition of pesticide from a foam delivery system and its distribution into the soil so as to control subsurface pests, alter soil properties, or the like.

The application of foamed pesticides to treat surfaces is also known. Copending application Ser. No. 08/063,361, filed May 17, 1993 and commonly assigned herewith, which is incorporated herein by reference, discloses the use of a wet foam with a specific degree of flowability for delivering pesticide dissolved or dispersed in the liquid carried by the wet foam to coat surfaces. It does not, however, disclose the use of foams for depositing and intermixing with soil to control subsurface crop pests or for fertilizer and/or soil adjuvant deposition and distribution into soil.

Another method which has been tried to control pests is via the generation of what is commonly referred to as a dry foam. Japanese patent publication SHO 58-43050, for example, shows the use of foams which include a termite pesticide, a foaming agent, an emulsifier and water. The foam is applied utilizing apparatus which is known to be used to chemically extinguish fires. Such an apparatus typically forms large volumes of foam in very short periods of time and the resulting foams have an expansion ratio, defined as the ratio of foam volume to volume of solution being foamed, of 100 to 1 or greater and substantially zero flowability in that the foams will disperse rather than flow. Further, the practical example set forth in the publication shows filling a volume approximately 1.5 feet high by 27 mats, each of which is substantially 18 square feet in area, utilizing approximately 1.75 cubic feet of solution. The total cubic volume being filled is then 1.5×27×18=729 cubic feet. Dividing this by 1.75 cubic feet gives an expansion ratio of 417 to 1. Japanese patent publication SHO 60-34901 has a similar disclosure and shows an expansion ratio of 150–500, preferably 200–400 liters per kilogram which is substantially the same per liter (liter per liter) as one kilogram of water occupies one liter in volume. The lowest expansion ratio shown, for a composition not of the invention, is less than 50 but is not otherwise specified. Japanese patent publication SHO 58-17161 is also of interest in this respect. The smallest expansion ratio (bubble multiplication) shown in the examples is 140 to 1.

Each of the aforementioned Japanese publications shows only the preparation of so-called dry foams and their application to relatively large crawl spaces. Dry foams do not carry enough pesticide to effectively control subsurface pests or to fertilize and/or otherwise alter the properties of soil. Thus, if they were to be injected beneath into the soil along with plowing, which is not contemplated by the publications and has not been attempted, they would not be capable of distributing throughout the soil an effective amount of 1) pesticide and thereby forming an effective pest barrier and/or 2) fertilizer or soil adjuvants to effectively alter the properties of the soil. Such foams would thus be highly unsuitable for and have not been utilized for the purpose of injection into the soil to control subsurface pests, etc.

British patent specification 1 274 442 is of interest in this area in that it shows the preparation of foams for being directly contacted with pests such as bacteria within closed containers or pipelines, apparently those associated with the food industry such as the milk and beer industries. Essentially, the containers or pipelines are filled with the foam which remains in place for a long enough time so that the pests can contact it directly and thereby be controlled. In the food industry, deposition of residual pesticides would be highly undesirable since contamination of the food (or drink) would almost certainly occur. Hence, British patent specification 1 274 442 is not concerned with foam deposition of residual pesticides, particularly not in soil or for the control of subsurface pests.

U.S. Pat. No. 4,822,613, issued Apr. 18, 1989 to A. Rodero discusses the preparation of pesticide containing highly stable water soluble foams which can be formed in situ utilizing a propellant, generally in a spray can type of arrangement. The patent discusses a foam which remains in place for a week or more. Control of pests is via direct contact with the foam which may be generated in place in a drain pipe. The foam can be washed away when it has done its job by flushing with water. This patent is also not concerned with depositing a pesticide in a soil to control subsurface pests.

It would be highly desirable if a method, an apparatus and/or a device were available for depositing a soil additive into soil to control subsurface pests in a manner such that the soil additive was very effectively and widely distributed throughout the soil while the amount of soil additive deposited was environmentally acceptable. The providing of such a device, apparatus and method constitutes the main objective of the present invention.

DISCLOSURE OF INVENTION

The present invention is directed to overcoming one or more of the problems as set forth above.

In accordance with an embodiment of the invention a method is set forth of distributing a soil additive into soil. The method comprises moving a tubular structure in a forward direction through soil, the member. A foam is generated which contains a soil additive. The foam is delivered to the lumen of the tubular structure adjacent its first portion under a pressure sufficient such that the foam flows out of a plurality of backwards facing ports.

In accordance with another embodiment of the invention a sub-soil injection device is set forth which is adapted for injecting a foam which contains a soil additive below the surface of soil and for concurrently distributing the foam into the soil as the foam is injected. The device comprises a tubular structure. The member is adapted to be mounted to and moved in a forward direction by a vehicle. The member has a wall structure defining a first portion adapted for receiving inflowing foam, a second portion, a leading portion, a trailing portion, a lumen extending from the first portion to the second portion, a pair of lateral portions and a plurality of ports. Each port has an inner end communicating with the lumen and an outer end communicating with the trailing portion. The ports are so constructed that foam flowing out of the outer end of the ports moves in a backwards direction. The ports are distributed along the member from the first portion thereof towards the second portion thereof. They are located so as to direct foam below the surface of the soil during use. The ports have minimum cross-sections of at least about 0.028 $in^2$. A shank structure also forms a part of the device. The shank structure has a forward-facing portion adapted to cut through soil and a back-facing portion attached to shield the member during forward motion of the shank structure through the soil. The shank structure precedes and shields the member as the shank structure and member are motivated by the vehicle in a forward direction through the soil.

In accordance with still another embodiment of the invention an apparatus is provided for injecting a foam which contains a soil additive below the surface of soil and for concurrently distributing the foam into the soil as the foam is injected. The apparatus comprises a vehicle, foam generating apparatus adapted for generating a foam which contains a soil additive and a device as set forth above carried by the vehicle and adapted to receive the foam in the lumen of the tubular structure.

In particular aspects of the embodiments as described in each of the foregoing paragraphs the tubular structure is vertically oriented, the first portion is an upper end portion and the second portion is a lower end portion with the ports being distributed at various levels along the length of the member.

The present invention, instead of employing application of liquid during plowing and relying on the liquid to mix with the soil to provide effective soil additive distribution relies on applying and plowing in foam, more specifically a wet foam which serves as a delivery vehicle for its liquid and the contained (dissolved or dispersed) soil additive to deliver the liquid and its contained soil additive in a relatively uniform manner throughout the soil in the target area. The foam has a much greater volume, for the same amount of liquid, than does the liquid alone. Since the foam will not almost immediately soak into the soil directly below where it is injected but will instead, for a short time, retain its identity as a foam, and retain the liquid in its intersticial spaces it can be much more efficiently distributed throughout the soil than can a liquid which is of significantly less volume. The preferred foam has the expansion ratio and flowability as defined herein. The delivery of a liquid (as part of a wet foam) and its included soil additive according to this invention and its distribution throughout the soil is therefore more uniform than is possible if one simply delivers the liquid as such. Also, if desired the foam can be used in combination with injection of a liquid as such.

Other objects and advantages of the invention are presented in the following description.

BRIEF DESCRIPTION OF THE DRAWINGS

The invention will be better understood by reference to the figures of the drawings wherein like parts denote like parts throughout and wherein:

FIG. 1 illustrates, in side view, an embodiment of an apparatus in accordance with an embodiment of the present invention;

FIG. 3 illustrates, in isometric view, a detail in the embodiment of FIGS. 1 and 2;

FIG. 4 illustrates, in isometric view taken from the rear and side, an embodiment of a preferred foam delivery tube and shank construction useful in the practice of the present invention;

FIG. 8 is a partial side view of a detail illustrating the mounting of the preferred foam delivery tube and shank construction of FIG. 4 to tool bars as shown in FIGS. 1 and 2;

BEST MODE FOR CARRYING OUT INVENTION

Figure 2:
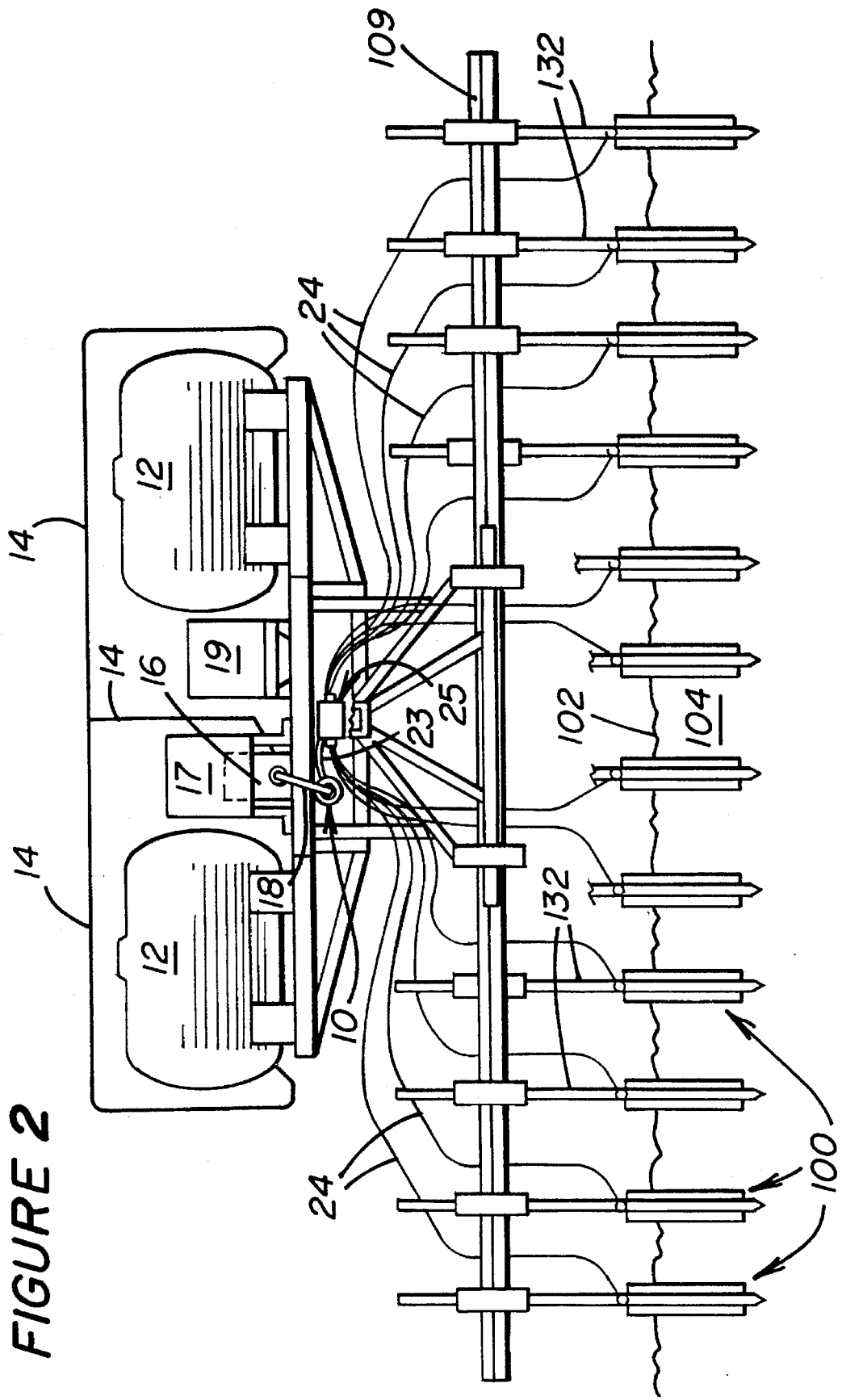
FIG. 2 illustrates a view taken along line 2—2 of FIG. 1.
Figure 6:
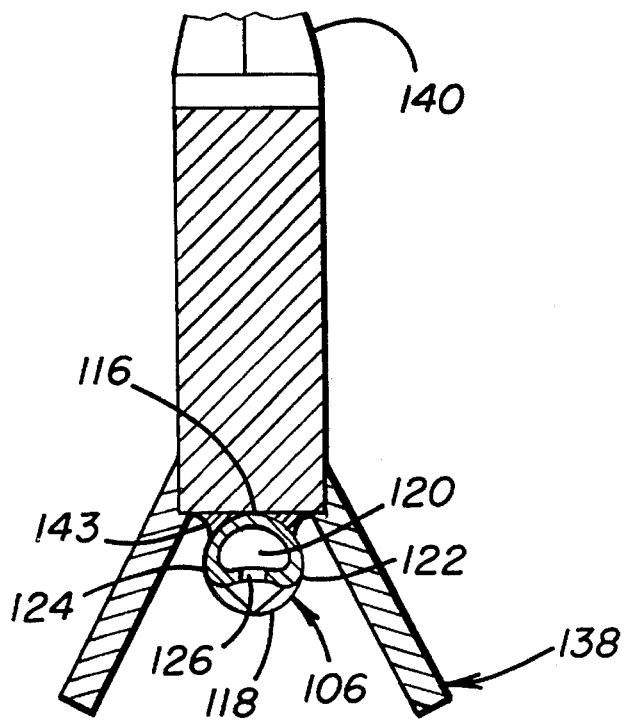
FIG. 6 is a sectional view taken along line 6—6 of FIG. 5.
Figure 5:
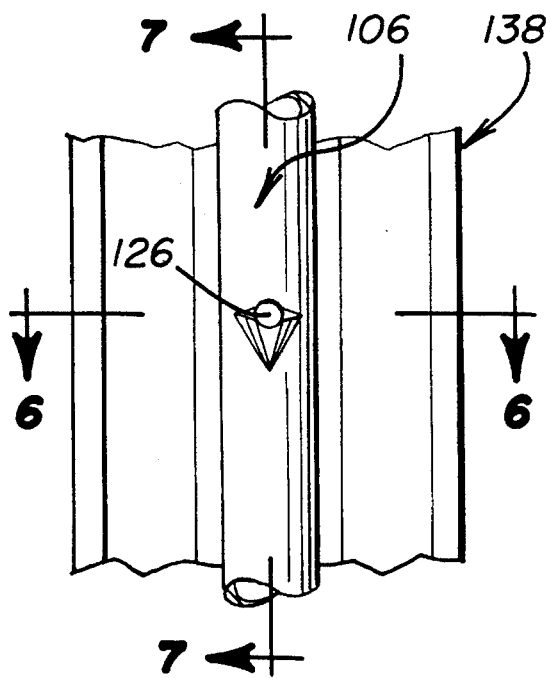
FIG. 5 is a partial rear view of the foam delivery tube and shank construction of FIG. 4.
Figure 7:
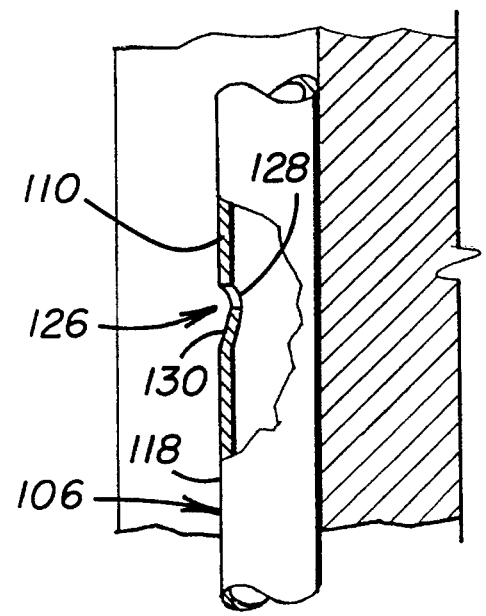
FIG. 7 is a view taken along line 7—7 of FIG. 5.

The first step in the method of practicing the present invention is to mix the soil additive (pesticide, fertilizer and/or soil adjuvant) with water, with surfactant (or "foaming agent") and with air to provide a desired foam. The foam that is to be applied is preferably a wet foam that contains not only the soil additive, the foaming agent, and the water, but also sufficient air or other gas to make it an effective foam. The foam can be drier or wetter depending on the soil to which it is to be applied, the characteristics of the soil additive being employed and the like. Such a foam is, of course, temporary and does not solidify but instead dissipates over a period of time as the liquid settles out and the air bubbles burst. Also, the distribution into the soil will tend to collapse the foam by providing surface contact and physical breaking forces to the gas-filled (generally air-filled) bubbles which make up the foam.

The term "soil additive" as used herein includes, but is not limited to: liquid or water dissolvable or suspendable pesticides such as herbicides, insecticides, fungicides, nematicides, bactericides and general biocides. All functional types of pesticides such as fumigants, desiccants, contact toxicants, pheromones, and other biocontrol agents are included in this definition. The term "soil additive" also includes liquid or water dissolvable or suspendable fertilizers and trace minerals (micronutrients) both natural and synthetic. Soil adjuvants such as repellants and attractants, growth regulators, pH adjustors, surfactants and other soil amending and pesticide enhancing agents are included, without limitation, in the term "soil additive" as used herein.

If the pests being controlled are nematodes the pesticide will generally be of a fumigant type. Mixtures of pesticides and, fertilizers and/or soil adjuvants may also be applied in accordance with the invention. Thus, for example, a volatile high toxicity pesticide which dissipates quickly might be used along with a residual toxicant and/or repellant and/or fertilizer and/or soil adjuvant.

The pesticide is preferably chosen with reference to the particular subsurface pest which is to be attacked. The pests will generally be weeds, nematodes, insects or soil borne pathogens.

Pesticides, especially insecticides, which have been found to be suitable for use in accordance with the present invention for application in a foam by plowing the foam into the soil include foams containing halogenated hydrocarbons such as 1,3-dichloropropene, 1,2-dichloropropane (often used in admixture), ethylenedibromide, dibromochloropropane, bromomethane (referred to as methyl bromide) and tetrachlorothiophene, isothiocynates such as sodium N-methyldithiocarbamate (anhydrous) (referred to as Metamsodium) and tetrahydro-3,5-dimethyl-2H,1,3,5-thiadiazine-2-thione, organophosphates such as diethyl 1,3-dithiethan-2-ylidenephosphoramidate, 0,0-diethyl S-(ethylthio)methylphosphorodithioate and 0,0-diethyl S[2-(ethylthio)ethyl]phosphorodithioate and carbamates such as 2-methyl-2-(methylthio)propionaldehyde-0-(methylcarbamoyl) oxime, 2,3-dihydro-2,2-dimethyl-7-benzofuranylmethylcarbamate or methyl N',N'-dimethyl-N-[(methyl carbamoyl)oxy]-1-thiooxamimidate. Note that these are merely exemplary pesticides and the above listing is not meant to be exhaustive or even nearly complete. Such compounds are discussed in, inter alia, "Pesticides Theory and Application", George W. Ware, W. H. Freeman and Company, New York, 1983 which is incorporated herein by reference.

Fertilizers which may be utilized in accordance with the present invention include but are not limited to: single and mixed solutions or suspensions of nitrogen, phosphate, potassium, sulfur and all essential macronutrients and micronutrients required for plant growth. Examples of such fertilizers are: monoammonium phosphate (MAP), diammonium phosphate (DAP), ammonium sulfate, other phosphate salts, chloride salts, nitrate salts, other sulfate salts, ammonia, solutions of urea, and all micronutrients, such as iron, manganese, magnesium, copper and the like. Natural, synthetic and chelated sources of soil nutrients can be applied by the foam method.

Soil oil adjuvants which may be utilized in accordance with the present invention include, but are not limited to: repellants and attractants, growth regulators such as juvenile hormones and plant growth regulators, pH adjustors such as acidifiers and buffers, surface active agents such as soil penetrating and wetting surfactants. Other adjuvants can be used with the foam method to impart desirable soil or pesticide enhancing qualities.

Soil additives, including soil insecticides, along with added foaming agents have been tested for foaming to make a foam that is suitable for use in soil application. Commercial formulations of pesticides, because of the chemical nature of the pesticides which effects the foaming properties, are particularly difficult to get to achieve an effective foam (generally defined as an air to liquid ratio, more properly a foam volume to contained liquid volume ratio, of greater than 3:1). This invention overcomes that difficulty as follows.

The liquid solution from which the foam is made may be comprised of one or more soil additives, a foaming agent and water. The foam is made from the liquid solution and a propellant, normally air. The soil additive and water may be combined with the liquid foaming agent in one or more suitable receptacles or tanks 12 as illustrated in FIGS. 1 and 2, and the combined solution may be pumped into a given quantity of compressed air in a mixer 10. The amount of compressed air and foaming agent used will vary with the selected soil additive and the application circumstances.

In accordance with the invention the amount of compressed air will be such as to provide a wet foam, which, for the purpose of this disclosure is defined as an effective foam having an expansion ratio of between 3 to 1 and 30 to 1, more preferably of between 5 to 1 and 25 to 1 and more preferably still of between 10 to 1 and 18 to 1. Such foams have enough stability and body and are sufficiently concentrated in soil additive so as to provide a reasonable distribution of the soil additive throughout the soil being treated utilizing foams which do not have unacceptably high concentration levels of the soil additive.

This is especially important when using the foam to distribute a pesticide in the soil since while low levels of the pesticide may be quite effective in controlling the pest, overly high pesticide levels may have adverse effects on the environment.

Flowability is a measure of the rate at which a foam flows, or foam fluidity and is definable by the following test:

The equipment used for determining foam fluidity for purposes of this invention consists of a rigid cylindrical tank measuring 29 cm in diameter and 37 cm in length. The top surface and cylindrical wall of the tank are closed, except for a small orifice in each. The base of the tank is closed. Specifically, the top surface of the tank has a 6 cm (diameter) orifice within about 1 cm from the tank perimeter. The lower portion of the cylindrical wall has a 5 cm (diameter) orifice within about 1 cm from the base of the tank, and diametrically opposite the orifice in the top surface. The tank is oriented such that its vertical axis is at a 45° angle with the horizontal and the 5 cm orifice projects downwardly.

In use, the 5 cm orifice is sealed and the tank is filled through the 6 cm orifice with the foam to be tested. Upon complete filling, the seal is removed immediately from the 5 cm orifice. The time required to drain the tank is a measure of the flowability of the foam. (Since burrs or other rough features in the 5 cm orifice can increase the friction experienced by the draining foam and therefore adversely impact the time for draining, the 5 cm orifice should be smoothwalled.)

Acceptable flowability results when the time is less than 15 minutes. Foams with an air-to-solution ratio above 20:1 have a rigidity which causes them to lack fluidity, i.e., require significantly more than 15 minutes to drain completely from the tank. However, foams with an air-to-solution ratio of up to 30:1 are still useful in the practice of the invention.

Referring to FIG. 3, the solution, along with air, is pushed through the mixer 10, which "works" the combination into a foam, as by moving it past various surfaces, thereby refining it into small dense bubbles and increasing the uniformity and durability of the bubbles or foam particles.

Once the foam has been properly formed and worked, it is ejected into the soil during a plowing operation through a device in accordance with the invention.

As shown in FIGS. 1 and 2, there may be one or more tanks 12 (two are illustrated in FIG. 2) containing liquid such as water containing a suitable soil additive, e.g., a pesticide, and a suitable foam generating chemical, all at suitable concentrations. The tanks 12 are connected by a conduits 14 to a pump 16 (shown in FIG. 2 as located behind a control panel 17) which is driven by a motor 19.

Fluid exiting the pump 16 passes via line 18 to the mixer 10. Pressurized air from an air compressor 20, also driven by motor 19, is passed via line 22 to the mixer 10 (Shown in FIGS. 2 and 3). Conventional pressure gauges, valves and flowmeters, not illustrated but generally conveniently mountable to the control panel 17, can be used to control flow. The resultant foamed mixture of air and liquid exits the mixer 10 via a conduit or hose 23 and passes to a sub-soil injection device 100 which is described below. In the embodiment illustrated the line 23 carries the foamed mixture to a manifold 25, seen best in FIG. 3, from which each one of a plurality of hoses 24 leads to a respective one of the soil injection devices 100. A valve (or valves), which can conveniently be mounted to the control panel 17, can be utilized to enable stoppage of the foam flow when a desired amount of foamed substance has been ejected.

The present invention is concerned, inter alia, with the sub-soil injection device 100 which is adapted for injecting a foam which contains a soil additive below the surface 102 of a soil 104 and for concurrently mixing the foam with the soil 104 as the foam is injected.

Referring to FIGS. 4–8, the illustrated embodiment of the device 100 comprises a linearly extending tubular structure 106 which is adapted to be mounted in generally vertical orientation to and moved in a forward direction by a vehicle 108 shown in FIG. 1. In the embodiment illustrated, the tubular structures 106 are mounted to a conventional tool bar 109, shown in more detail in FIG. 8, mounted to and located behind the vehicle 108. The member 106 extends from the vehicle 108 downwardly into the soil 104. A surface flattening plate 111 is generally mounted to the vehicle 108 behind the tubular structures 106. It serves to flatten and shape the soil between the tubular structures 106 after they have plowed through the soil. Side plates 113 can be utilized to shape the soil into beds with trenches formed by the side plates 113 separating ridges flattened by the flattening plate 111.

The member 106 is best seen in FIGS. 4–8. It has a wall structure 110 which defines an upper end portion 112 adapted for receiving inflowing foam. The member 106 also has a lower end portion 114, a leading portion 116 and a trailing portion 118 A lumen 120 extends along the member 106 from the upper end portion 112 to the lower end portion 114. A pair of lateral portions 122,124 and a plurality of vertically spaced ports 126 are also defined by the tubular structure 106.

Each of the ports 126 has an inner end 128 which communicates with the lumen 120 and an outer end 130 which communicates with the trailing portion 118 of the tubular structure 106. The ports 126 are so constructed that foam flowing out of the outer end 130 of the ports 126 moves in an outward and downward direction. The ports are vertically distributed along the member 106 from the lower end portion 114 thereof towards upper end portion 112 thereof. The ports 126 are located so as to be below the surface of the soil 104 during use. The ports 126 each have a minimum cross-section of at least about 0.028 in$^2$ (an originally circular hole of approximately this area can be made with a 3/16th inch diameter drill) and of no more than about 0.45 in$^2$ (an originally circular hole of approximately this area can be made with a 3/4th inch diameter drill). The ports 126 can be conveniently formed as follows. Circular holes can be drilled into the member 106 and then deformed to the desired shape by heating the member 106 and then hammering a chisel against the member 106 on the lower (when vertically mounted for use) edge of the hole.

The lower end portion 114 of the member 106 can, in the embodiment illustrated, extend forwardly starting from a position intermediate the lower end portion 114 and the upper end portion 112 and extending to the lower end portion 114.

In accordance with the invention the device 100 also includes a shank structure 132 which has a forward-facing portion 134 which is adapted to cut through the soil 104 and a back-facing portion 136 which is attached to the leading portion 116 of the member 106. The shank structure 132 precedes and shields the leading portion 116 of the member 106 as the shank structure 132 and the member 106 are moved by the vehicle 108 in a forward direction through the soil 104.

Figure 12:
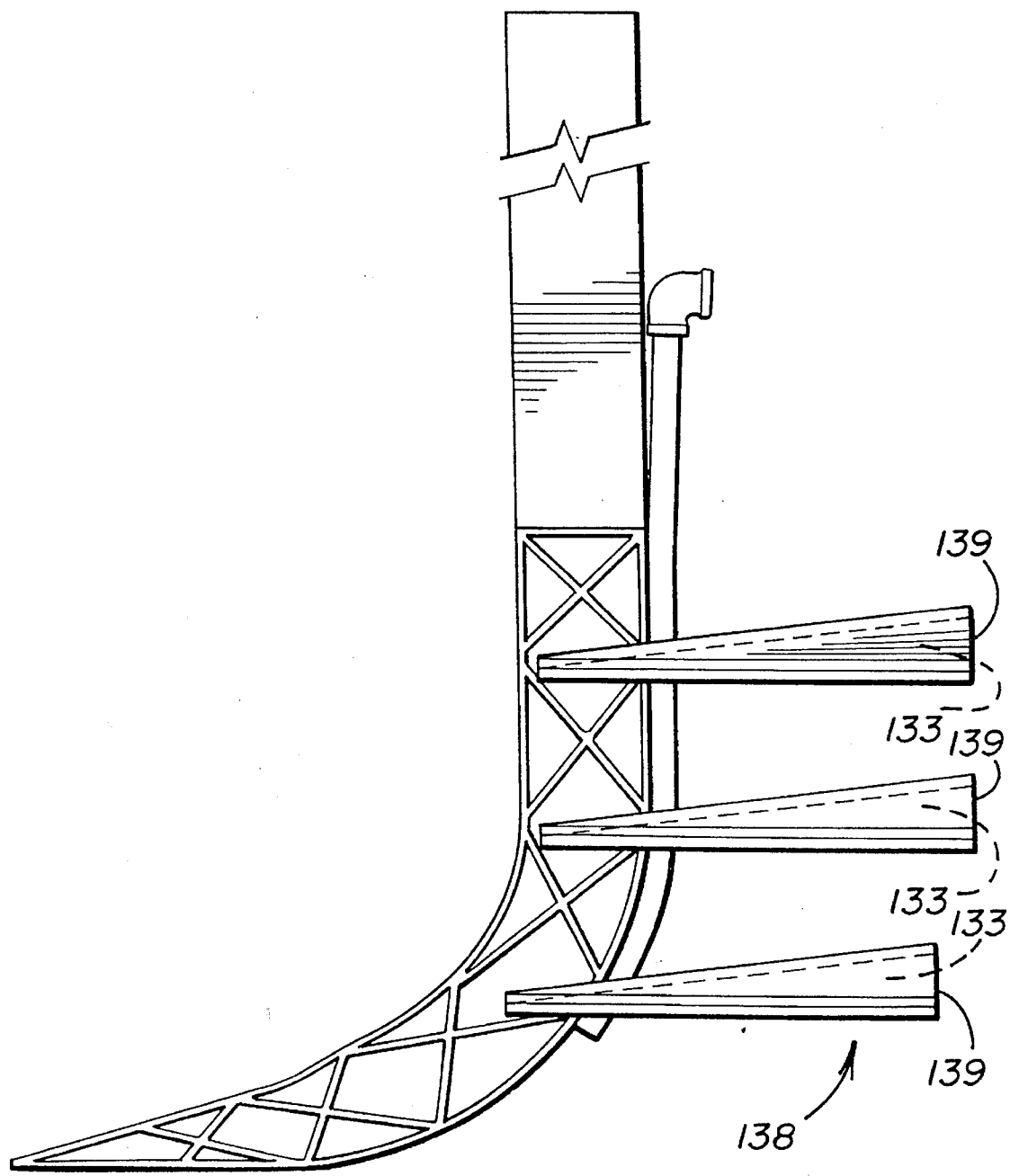
FIG. 12 illustrates, in side view, an alternative embodiment useful in accordance with the invention.
Figure 13:
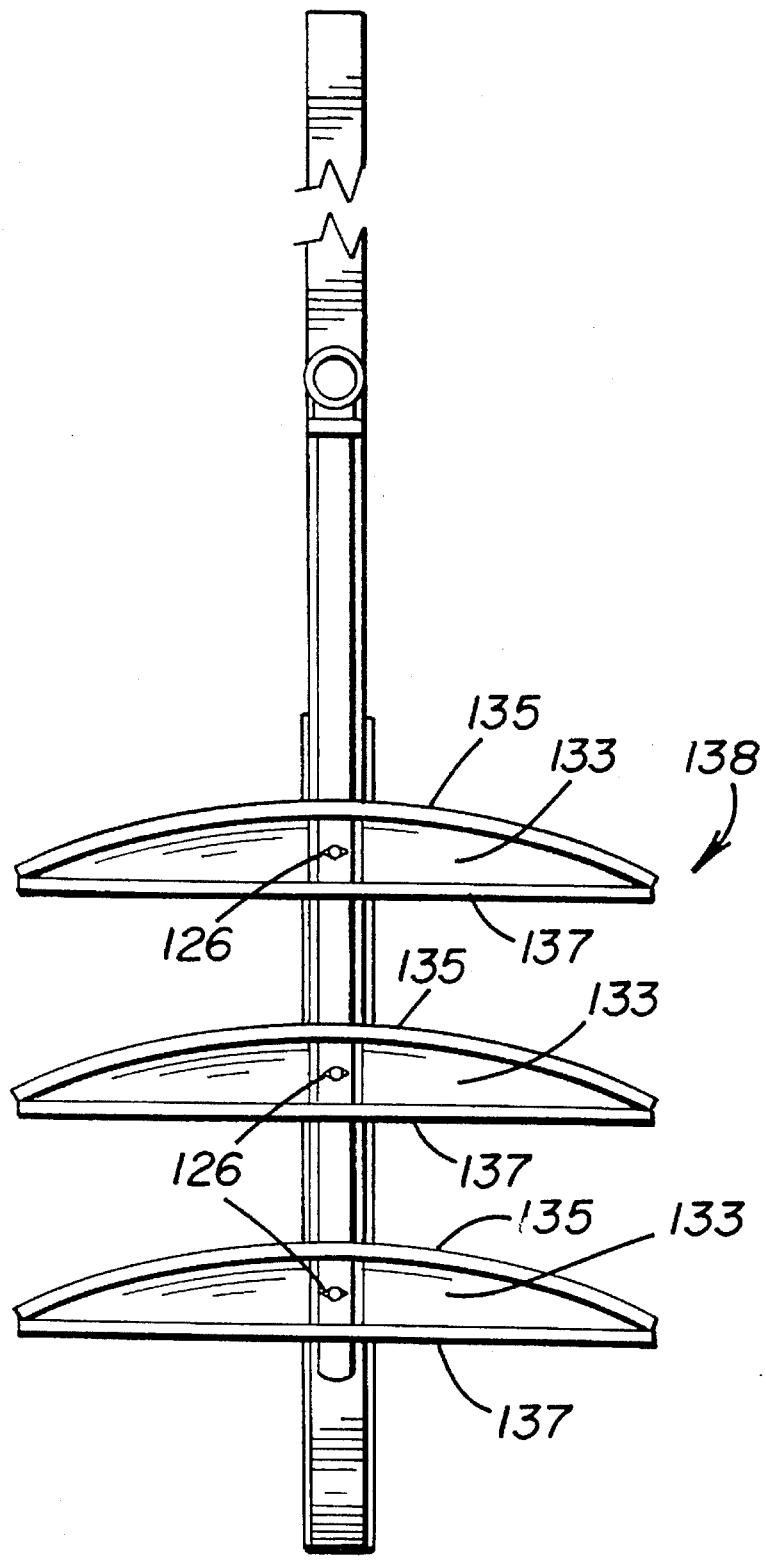
FIG. 13 is a rear view of the embodiment of FIG. 12.

In accordance with the present invention there is a cavity creating structure 138, which in some embodiments is in the nature of wings and which extends generally backwardly and outwardly from the shank structure 132 and about the member 106 on each side of the ports 126. The cavity creating structure 138 creates a cavity when moved through the soil. The cavity creating structure is important in that it serves to assure that the foam is deposited from the ports 126 into a cavity formed behind the cavity creating structure 138 as it moves forwardly through the soil 104. In the embodiment of FIGS. 12–13 the cavity creating structure 138 includes ducts 133 formed by a pairs of plates 135 and 137, the plates being attached as by welding to extend rearwardly from the shank structure 132. The ports 126 open into the ducts 133 and the foam exits via their open rear ends 139.

In accordance with the embodiment illustrated and to aid in its passage through the soil 104, a portion 140 of the shank structure 132 adjacent the lower end portion 114 of the member 106 extends increasingly forwardly starting from a position 141 intermediate the upper end portion 112 and the lower end portion 114 of the member 106 and continuing to the lower end portion 114 of the member 106. Suitably, the leading portion 116 of the member 106 is attached to the shank structure 132 by a weldment 143 (seen in FIG. 6) or is otherwise made integral with the member 106.

Figure 9:
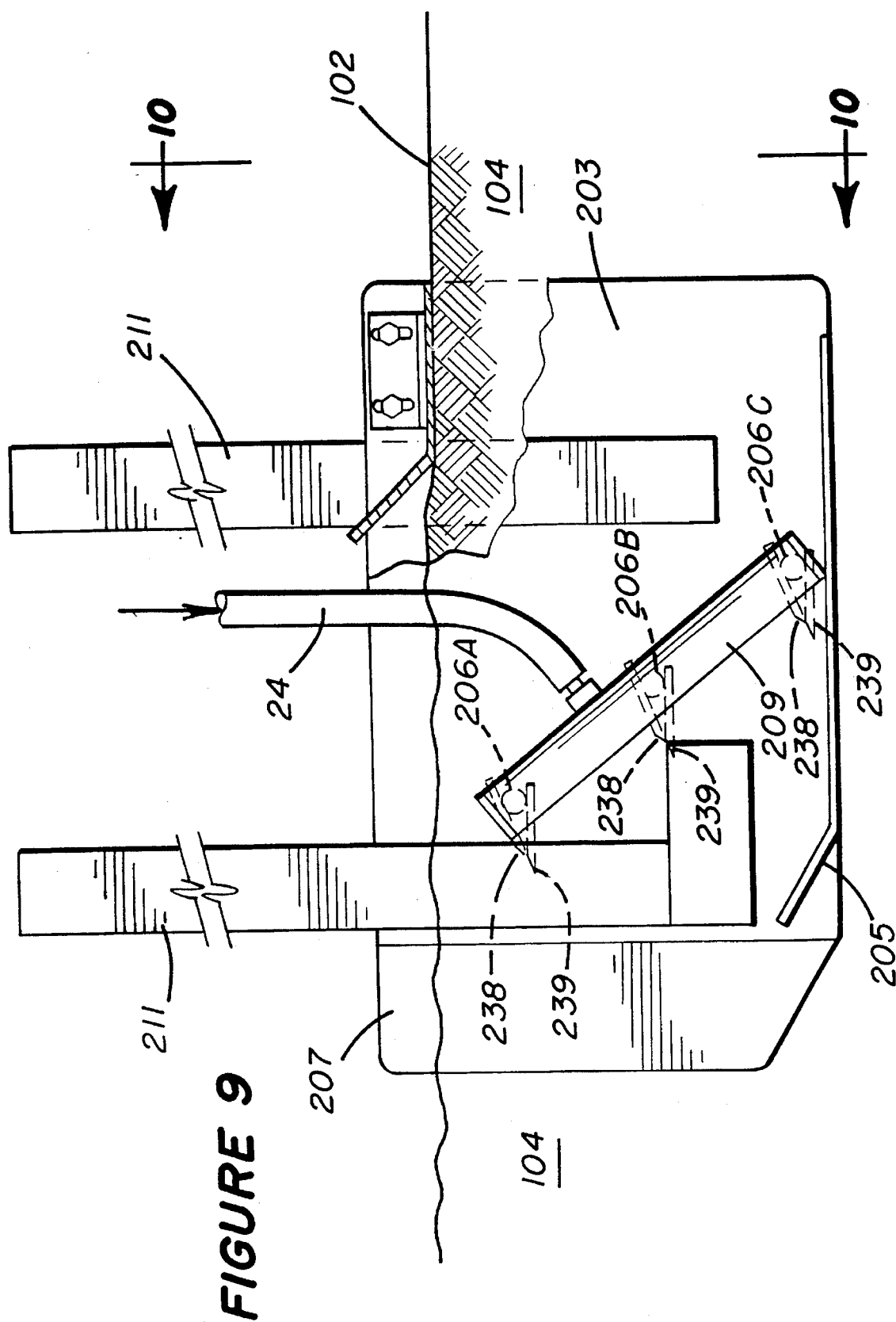
FIG. 9 illustrates, in a side sectional view, an alternate embodiment of the invention.
Figure 10:
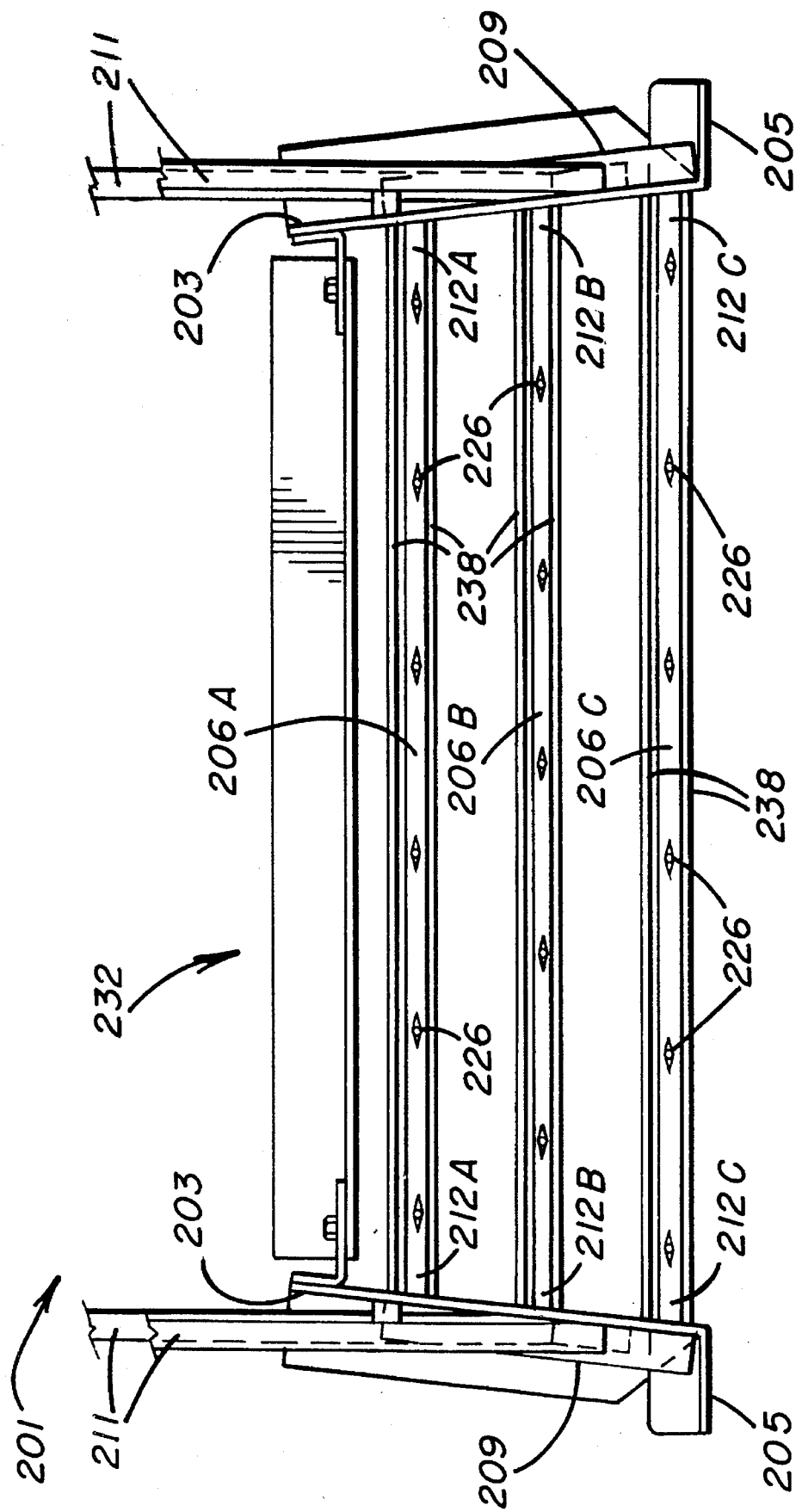
FIG. 10 is a rear view of the embodiment of FIG. 9.
Figure 11:
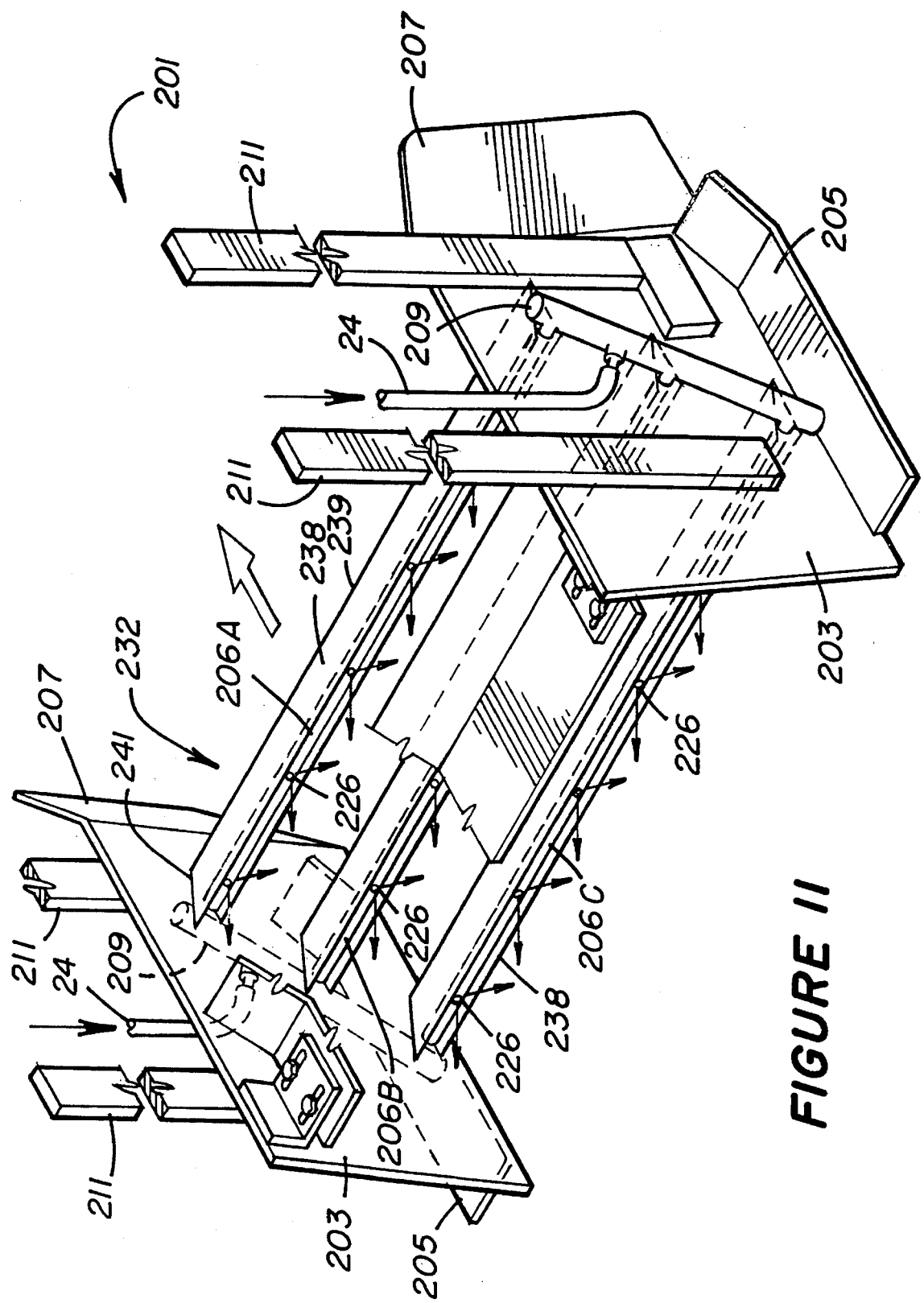
FIG. 11 is a top view of the embodiment of FIG. 8.

The embodiment of the shank structure 232 and of the members 206A, 206B and 206C illustrated in FIGS. 9–11 differs in specific structure from the corresponding structures as illustrated in the embodiment of FIGS. 4–8. The embodiment of FIGS. 9–11 is particularly designed for use with crops where it is desired to uniformly mix the soil additive throughout the soil to a limited depth rather than uniformly mixing it only in the area about the crop as in the embodiment of FIGS. 4–8 wherein the soil additive is generally confined to the central area of the ridges formed by the flattening plate 111 and the side plates 113. The embodiment of FIGS. 9–11 is useful with such crops as strawberries which have relatively shallow but laterally extending root systems. It is within the scope of the invention that a number of differing structures may be utilized, depending on the particular crop, soil type and soil additive, all of which structures have certain common features as defined herein.

Referring to FIGS. 9–11, the structure illustrated includes three members 206A, 206B and 206C aligned generally parallel to one another and being mounted to the shank structure 232 in generally horizontal and vertically separated alignment so as to expel foam at three different levels. The uppermost (in use) member 206A will generally be running just below the level of the surface 102 of the soil 104. As the unit 201 moves through the soil in a forward direction foam is ejected out of the backs of the members 206A, 206B and 206C. The ports 226 can be shaped as shown in the embodiment of FIGS. 4–8 but may better be formed (e.g., by using a chisel as previously set forth) so as to extend horizontally in both directions from an originally circular hole (of the size range previously set forth) so as to provide better lateral spread of the foam. In operation, foam from the mixer 10 is flowed via appropriate hoses 24 to a foam distribution tube 209 which delivers the foam to the respective first portions 212A, 212B and 12C of the lumens of the members 206A, 206B and 206C.

The shank structure 232 preferably includes side plates 203 for holding soil from falling back in place. Skid plates 205 are preferably attached, as by a weldment, to the side plates 203 to deter the shank structure 232 from being pulled down into the soil as it is motivated forwardly. Front edges 207 of the side plates 203 can be angled upwardly, as illustrated, to gather back soil which falls into the furrow. Bars 211 provide support for the shank structure 232. The bars 211 can be attached to tool bars 109 as illustrated for the embodiment of FIGS. 4–8. The bars 211 are attached, generally by welding, to the side plates 203.

A cavity creating structure 238 is preferably utilized to create an opening to receive the foam, just as in the embodiment of FIGS. 4–8. The cavity creating structure 238 has a forward angled edge 239 which aids the shank structure to cut through the soil. The ends 241 of the cavity creating structure 238 are welded or otherwise attached to the side plates 203. It is not necessary to weld the cavity creating structure 238 to the members 206A, 206B and 206C.

Foam generating apparatus of the nature disclosed herein may be utilized and is adapted for generating a foam which contains a soil additive. The apparatus of the present invention can include the vehicle 108. The foam generating apparatus discussed above can be used for generating the foam which contains a soil additive and for insertion of the foam into the structure 106 or structures 206A, 206B, 206C from which it can flow into the soil 104.

The invention also provides a method of depositing and distributing a soil additive into the soil. In accordance with the method the linearly extending tubular structure 106, or structures 206A, 206B, 206C, are moved in a forward direction through the soil 104. The member 106 or structures 206A, 206B, 206C are as defined above. Foam is generated which contains a soil additive, often a pesticide. The foam is delivered to the lumen 120 adjacent the first portion 112, or first portions 212A, 212B, 212C, of the tubular member 106, or structures 206A, 206B, 206C, under pressure sufficient such that the foam flows out of the ports 126 or 226. Generally, the moving of the tubular structure 106, or structures 206A, 206B, 206C, is accomplished by attaching the shank structure 132 or 232 to the vehicle 108 and driving the vehicle 108 in a desired direction. The shank structure 132 or 232 serves to plow the soil, thus generally making a separate plowing operation unnecessary.

INDUSTRIAL APPLICABILITY

The invention provides a method, an apparatus and, a device utilizing a foam which includes a soil additive, for example, a pesticide, to deliver and distribute the additive into the soil, for example, to control subsurface pests such as nematodes in an effective, economical and environmentally sound manner.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A method of distributing a soil additive into soil, comprising: moving a tubular structure in a forward direction through soil, the tubular structure having a wall structure defining a first portion adapted for receiving inflowing foam, a second portion, a leading portion, a trailing portion, a lumen extending along the tubular structure from the first portion to the second portion, a pair of lateral portions and a plurality of spaced apart ports each having an inner end communicating with the lumen and an outer end communicating with the trailing portion, the ports being so constructed that foam flowing out of the outer ends of the ports moves in a backwards direction, the ports being distributed along the trailing portion of the tubular structure from the first portion of the tubular structure towards the second portion of the tubular structure and being located so as to deliver foam below the surface of the soil during use, the ports having minimum cross-sections of at least about 0.028 in$^2$;

generating a foam containing the soil additive; and delivering the foam to the lumen adjacent the first portion of the tubular structure under a pressure sufficient such that the foam flows out of the ports.

2. A method as set forth in claim 1, wherein the moving of the tubular structure is by attaching of the shank structure to a vehicle and driving of the vehicle in a desired direction, the shank structure having a forward-facing portion adapted to cut through soil and a back-facing portion attached to precede and shield the leading portion of the tubular structure as the shank is motivated by the vehicle in a forward direction through the soil.

3. A method as set forth in claim 1, further including shielding the ports of the tubular structure with a cavity creating structure which extends generally backwardly and outwardly from the shank structure and about the tubular structure on each side of the ports.

4. An apparatus as set forth in claim 3, wherein the tubular structure is linearly extending and is mounted in generally vertical orientation, the first portion of the tubular structure is an upper end portion thereof arid the second portion of the tubular structure is a lower end portion thereof.

5. A method as set forth in claim 4, further including aiding moving of the tubular structure through the soil by providing a portion of the shank structure adjacent the lower end portion of the tubular structure which extends increasingly forwardly from a position intermediate the upper and lower end portions of the tubular structure to the lower end portion of the tubular structure.

6. A method as set forth in claim 5, further including aiding distribution of the foam into the soil by providing the lower end portion of the tubular structure extending forwardly from a position intermediate the upper and lower end portions of the tubular structure to the lower end portion of the tubular structure.

7. A method as set forth in claim 5, wherein the foam has an expansion ratio, defined as the ratio of foam volume to volume of liquid utilized in forming the foam, which falls within a range from about 3 to about 30 and wherein the foam has a flowability of from about 5 seconds to about 15 minutes.

8. A method as set forth in claim 1, wherein the foam has an expansion ratio, defined as the ratio of foam volume to volume of liquid utilized in forming the foam, which falls within a range from about 3 to about 30 and wherein the foam has a flowability of from about 5 seconds to about 15 minutes.

9. An apparatus as set forth in claim 3, wherein the ports have maximum cross-sections of less than about 0.45 in$^2$.

10. A sub-soil injection device adapted for injecting a foam which contains a soil additive below the surface of a soil and for concurrently distributing the foam into soil as the foam is injected, comprising:

a tubular structure adapted to be mounted to and moved in a forward direction by a vehicle and to extend from the vehicle into the soil, the tubular structure having a wall structure defining a first portion adapted for receiving inflowing foam, a second portion, a leading portion, a trailing portion, a lumen extending along the tubular structure from the first portion to the second portion, a pair of lateral portions and a plurality of spaced ports each having an inner end communicating with the lumen and an outer end communicating with the trailing portion, the ports being so constructed that foam flowing out of the outer end of the ports moves in a backward direction, the ports being distributed along the tubular structure from the first portion thereof towards the second portion thereof and being located so as to deliver foam below the surface of the soil during use, the ports having minimum cross-sections of at least about 0.028 in$^2$; and a shank structure having a forward-facing portion adapted to cut through soil and being attached to precede and shield the leading portion of the tubular structure as the shank structure and tubular structure are motivated by the vehicle in a forward direction through the soil.

11. A device as set forth in claim 10, further including a cavity creating structure extending generally backwardly and outwardly from the shank structure and about the tubular structure on each side of the ports.

12. A device as set forth in claim 11, wherein the tubular structure is linearly extending and is in generally vertical orientation, the first portion of the tubular structure is an upper end portion thereof and the second portion of the tubular structure is a lower end portion thereof.

13. A device as set forth in claim 12, wherein a portion of the shank structure adjacent the lower end portion of the tubular structure extends increasingly forwardly from a position intermediate the upper and lower end portions of the tubular structure to the lower end portion of the tubular structure.

14. A device as set forth in claim 13, wherein the lower end portion of the tubular structure extends forwardly from a position intermediate the upper and lower end portions of the tubular structure to the lower end portion of the tubular structure.

15. A device as set forth in claim 14, wherein the leading portion of the tubular structure is attached to the shank structure by a weldment.

16. A device as set forth in claim 10, wherein the leading portion of the tubular structure is attached to the shank structure by a weldment.

17. A device as set forth in claim 10, wherein the ports have maximum cross-sections of less than about 0.45 in$^2$.

18. An apparatus for injecting a foam which contains a soil additive below the surface of soil and for concurrently distributing the foam into soil as the foam is injected, comprising:

a vehicle;

foam generating apparatus adapted for generating a foam which contains the soil additive;

a tubular structure adapted to be mounted to and moved in a forward direction by the vehicle and to extend from the vehicle into the soil, the tubular structure having a wall structure defining a first portion adapted for receiving inflowing foam, a second portion, a leading portion, a trailing portion, a lumen extending along the tubular structure from the first portion to the second portion, a pair of lateral portions and a plurality of vertically spaced ports each having an inner end communicating with the lumen and an outer end communicating with the trailing portion, the ports being so constructed that foam flowing out of the outer end of the ports moves in a backwards direction, the ports being distributed along the tubular structure from the first portion thereof towards the second portion thereof and being located so as to deliver foam below the surface of the soil during use, the ports having minimum cross-sections of at least about 0.028 in$^2$; and a shank structure having a forward-facing portion adapted to cut through soil, the shank structure being attached to precede and shield the leading portion of the tubular structure as the shank structure and tubular structure are motivated by the vehicle in a forward direction through the soil.

19. An apparatus as set forth in claim 18, further including a cavity creating structure extending generally backwardly and outwardly from the shank structure and about the tubular structure on each side of the ports.

20. An apparatus as set forth in claim 19, wherein the tubular structure is linearly extending and is mounted in generally vertical orientation, the first portion of the tubular structure is an upper end portion thereof and the second portion of the tubular structure is a lower end portion thereof.

21. An apparatus as set forth in claim 20, wherein a portion of the shank structure adjacent the lower end portion of the tubular structure extends increasingly forwardly from a position intermediate the upper and lower end portions of the tubular structure to the lower end portion of the tubular structure.

22. An apparatus as set forth in claim 21, wherein the lower end portion of the tubular structure extends forwardly from a position intermediate the upper and lower end portions of the tubular structure to the lower end portion of the tubular structure.

23. An apparatus as set forth in claim 22, wherein the leading portion of the tubular structure is attached to the shank structure by a weldment.

24. An apparatus as set forth in claim 18, wherein the leading portion of the tubular structure is attached to the shank structure by a weldment.

25. An apparatus as set forth in claim 18, wherein the ports have maximum cross-sections of less than about 0.45 in$^2$.

* * * * *